US008620712B1

(12) United States Patent
Mori et al.

(10) Patent No.: US 8,620,712 B1
(45) Date of Patent: Dec. 31, 2013

(54) METHOD AND SYSTEM OF INTELLIGENT MATCHING FOR MEETINGS

(75) Inventors: Kenichi Mori, Carlsbad, CA (US);
Cathy C. Goode, San Diego, CA (US);
Vincent Cheng, San Diego, CA (US);
Barrett D. Saik, Cardiff, CA (US)

(73) Assignee: Intuit Inc., Mountain View, CA (US)

( * ) Notice: Subject to any disclaimer, the term of this patent is extended or adjusted under 35 U.S.C. 154(b) by 1792 days.

(21) Appl. No.: 11/698,595

(22) Filed: Jan. 26, 2007

(51) Int. Cl.
*G06Q 10/00* (2012.01)

(52) U.S. Cl.
USPC ....... 705/7.19; 705/7.14; 705/7.15; 705/7.16; 705/7.17; 705/7.18

(58) Field of Classification Search
USPC ................................. 705/7.11–7.42
See application file for complete search history.

(56) References Cited

U.S. PATENT DOCUMENTS

| | | | | |
|---|---|---|---|---|
| 5,054,096 A * | 10/1991 | Beizer | .......................... | 382/305 |
| 5,772,251 A * | 6/1998 | Fleck | ........................... | 283/115 |
| 5,862,325 A * | 1/1999 | Reed et al. | ..................... | 709/201 |
| 5,930,764 A * | 7/1999 | Melchione et al. | ............. | 705/10 |
| 5,970,466 A * | 10/1999 | Detjen et al. | ....................... | 705/8 |
| 6,067,525 A * | 5/2000 | Johnson et al. | .................. | 705/10 |
| 6,340,977 B1 * | 1/2002 | Lui et al. | ........................ | 715/709 |
| 6,343,273 B1 * | 1/2002 | Nahan et al. | ....................... | 705/5 |
| 6,711,554 B1 * | 3/2004 | Salzmann et al. | ............... | 705/64 |
| 6,728,784 B1 * | 4/2004 | Mattaway | ..................... | 709/245 |
| 6,957,186 B1 * | 10/2005 | Guheen et al. | ................. | 705/323 |
| 6,961,418 B1 * | 11/2005 | Thygeson et al. | ........ | 379/210.01 |
| 7,065,528 B2 * | 6/2006 | Herz et al. | ............................ | 1/1 |
| 7,113,797 B2 * | 9/2006 | Kelley et al. | ................ | 455/456.2 |
| 7,188,073 B1 * | 3/2007 | Tam et al. | .......................... | 705/9 |
| 7,234,103 B1 * | 6/2007 | Regan | .......................... | 715/234 |
| 7,249,080 B1 * | 7/2007 | Hoffman et al. | ............ | 705/36 R |
| 7,337,032 B1 * | 2/2008 | Nettles et al. | .................. | 700/100 |
| 7,346,531 B2 * | 3/2008 | Jacobs | .............................. | 705/8 |
| 7,502,752 B1 * | 3/2009 | Lemons et al. | .................. | 705/35 |
| 7,680,756 B2 * | 3/2010 | Quinn et al. | ..................... | 706/50 |
| 7,689,441 B1 * | 3/2010 | Craft | ................................. | 705/3 |
| 7,693,735 B2 * | 4/2010 | Carmi et al. | ...................... | 705/9 |
| 7,698,342 B1 * | 4/2010 | Evans et al. | ................... | 707/755 |
| 7,725,339 B1 * | 5/2010 | Aykin | .......................... | 705/7.14 |
| 7,753,258 B1 * | 7/2010 | Quinn et al. | ................... | 235/379 |
| 7,756,761 B1 * | 7/2010 | Albrecht | ......................... | 705/31 |
| 7,809,629 B2 * | 10/2010 | Hustad et al. | ................... | 705/37 |
| 7,836,140 B2 * | 11/2010 | Conmy et al. | ................. | 709/206 |
| 7,844,500 B2 * | 11/2010 | Ran | .............................. | 705/26.8 |
| 7,865,829 B1 * | 1/2011 | Goldfield et al. | ............ | 715/708 |
| 7,869,941 B2 * | 1/2011 | Coughlin et al. | ............. | 701/533 |
| 8,060,500 B1 * | 11/2011 | Fitch et al. | ..................... | 707/724 |
| 2002/0029161 A1 * | 3/2002 | Brodersen et al. | ................ | 705/9 |

(Continued)

OTHER PUBLICATIONS

Willen, Claudia "The ABCs of Outlook 97" 1997.*

(Continued)

*Primary Examiner* — Alan S Miller
(74) *Attorney, Agent, or Firm* — Osha Liang LLP (57) ABSTRACT

A method of scheduling at least one meeting for a consumer involves matching the consumer to a first professional of a plurality of professionals based on information associated with the consumer and the plurality of professionals, where the first professional is qualified to provide service to the consumer, scheduling a first meeting between the consumer and the first professional, and notifying the consumer and the first professional about the first meeting using information associated with the first meeting.

35 Claims, 4 Drawing Sheets

(56) References Cited

U.S. PATENT DOCUMENTS

| | | | |
|---|---|---|---|
| 2002/0038233 A1* | 3/2002 | Shubov et al. | 705/8 |
| 2002/0059082 A1* | 5/2002 | Moczygemba | 705/3 |
| 2002/0111888 A1* | 8/2002 | Stanley et al. | 705/31 |
| 2002/0138389 A1* | 9/2002 | Martone et al. | 705/36 |
| 2002/0156672 A1* | 10/2002 | Burko | 705/9 |
| 2002/0168621 A1* | 11/2002 | Cook et al. | 434/350 |
| 2002/0178453 A1* | 11/2002 | Jun et al. | 725/88 |
| 2002/0184063 A1* | 12/2002 | Kaufman et al. | 705/7 |
| 2003/0004856 A1* | 1/2003 | Brown et al. | 705/37 |
| 2003/0182178 A1* | 9/2003 | D'Elena et al. | 705/11 |
| 2003/0216928 A1* | 11/2003 | Shour | 705/1 |
| 2003/0219709 A1* | 11/2003 | Olenick et al. | 434/350 |
| 2003/0233296 A1* | 12/2003 | Wagner | 705/31 |
| 2004/0019579 A1* | 1/2004 | Herz et al. | 707/1 |
| 2004/0177002 A1* | 9/2004 | Abelow | 705/14 |
| 2004/0193458 A1* | 9/2004 | Bear | 705/5 |
| 2005/0038722 A1* | 2/2005 | Throndson et al. | 705/31 |
| 2005/0055290 A1* | 3/2005 | Bross et al. | 705/31 |
| 2005/0080775 A1* | 4/2005 | Colledge et al. | 707/3 |
| 2006/0068787 A1* | 3/2006 | Deshpande et al. | 455/435.3 |
| 2006/0106644 A1* | 5/2006 | Koo et al. | 705/3 |
| 2006/0112086 A1* | 5/2006 | Douress et al. | 707/3 |
| 2006/0129444 A1* | 6/2006 | Baeza et al. | 705/8 |
| 2006/0143060 A1* | 6/2006 | Conry et al. | 705/8 |
| 2006/0147005 A1* | 7/2006 | Taub | 379/114.2 |
| 2006/0155618 A1* | 7/2006 | Wyle | 705/31 |
| 2006/0161468 A1* | 7/2006 | Larsen et al. | 705/8 |
| 2006/0195339 A1* | 8/2006 | Backhaus et al. | 705/2 |
| 2007/0033116 A1* | 2/2007 | Murray | 705/31 |
| 2007/0078697 A1* | 4/2007 | Nixon | 705/9 |
| 2007/0083403 A1* | 4/2007 | Baldwin et al. | 705/7 |
| 2007/0094044 A1* | 4/2007 | Stone et al. | 705/2 |
| 2007/0162308 A1* | 7/2007 | Peters | 705/2 |
| 2007/0203780 A1* | 8/2007 | Wienreb et al. | 705/9 |
| 2007/0250343 A1* | 10/2007 | Sohal | 705/2 |
| 2008/0065726 A1* | 3/2008 | Schoenberg | 709/205 |
| 2008/0102428 A1* | 5/2008 | Levy et al. | 434/322 |
| 2008/0114638 A1* | 5/2008 | Colliau et al. | 705/9 |
| 2008/0249830 A1* | 10/2008 | Gilman et al. | 705/9 |
| 2008/0312963 A1* | 12/2008 | Reiner | 705/2 |
| 2009/0132329 A1* | 5/2009 | Lam et al. | 705/9 |
| 2009/0138317 A1* | 5/2009 | Schoenberg | 705/9 |
| 2010/0153162 A1* | 6/2010 | Tam et al. | 705/8 |

OTHER PUBLICATIONS

Padwick, Gordon; Ray, Bill; "Using Microsoft Outlook 98" QUE Corporation, ISBN 0-7897-1516-3 1998.*

Cohon, Charles "Rep fights sales meeting conflicts with free Internet Web Site" Agency Sales. Irvine: Aug. 1997 vol. 27, Iss. 8.*

"Russell Information Sciences brings the first real-time scheduler solution to the World Wide Web" Business Wire, May 19, 1997. Dialog file 16:05034954.*

1995 IRS tax forms retrieved from http://www.irs.gov/pub/irs-prior/i1040--1995.pdf and http://www.irs.gov/pub/irs-prior/fw4--1995.pdf.*

* cited by examiner

METHOD AND SYSTEM OF INTELLIGENT MATCHING FOR MEETINGS

BACKGROUND

Millions of people need professional services from certified and/or trained professionals on a daily basis. Generally, a consumer in need of a professional service searches for a specific individual or a business that is qualified to perform the professional service.

For example, a consumer that needs to file a tax return for his business may search for and eventually find an accounting firm to meet with an accountant. If the accountant is not able to competently provide the service the consumer may be unable to timely file the tax return, receive inadequate or incorrect advice, or not receive the appropriate refund to which the business is entitled. As a result, the consumer may go to a different accounting firm the next year for filing taxes. Alternatively, if the accountant or the consumer determines during the meeting that the accountant is not qualified to provide service to the consumer, the consumer may be referred to another accountant after having spent considerable time and effort with the first accountant.

In another example, a consumer who regularly files personal taxes with an accountant for many years is likely to go to the accountant even if the consumer's needs now include filing taxes for a privately owned business. The consumer may be unaware that the accountant is not qualified to provide competent service for the consumer's changed needs.

To find qualified professionals, a consumer may use professional referral services. Similarly, to provide qualified services, professionals can be listed with referral services. Once a consumer's needs are determined in a meeting, the referral service may refer the consumer to a professional qualified to service the consumer appropriately.

SUMMARY

In general, in one aspect, the invention relates to a method for scheduling at least one meeting for a consumer. The method comprises matching the consumer to a first professional of a plurality of professionals based on information associated with the consumer and the plurality of professionals, where the first professional is qualified to provide service to the consumer, scheduling a first meeting between the consumer and the first professional, and notifying the consumer and the first professional about the first meeting using information associated with the first meeting.

In general, in one aspect, the invention relates to a method for arranging for at least one meeting by a consumer. The method comprises entering information associated with the consumer while requesting the at least one meeting, where the consumer is matched to a professional of a plurality of professionals based on at least information associated with the plurality of professionals and entered by the consumer, where the professional is qualified to provide service to the consumer, and receiving a notification of the at least one meeting scheduled between the consumer and the professional based on information associated with the at least one meeting.

In general, in one aspect, the invention relates to a system of scheduling at least one meeting for a consumer. The system comprises a matcher comprising functionality for: matching the consumer with a first professional of a plurality of professionals based on information associated with the consumer and the plurality of professionals, where the first professional is qualified to provide service to the consumer, and a scheduler comprising functionality for: scheduling a first meeting between the consumer and the first professional, and notifying the consumer and the first professional about the first meeting using information associated with the first meeting.

In general, in one aspect, the invention relates to a computer readable medium comprising instructions for scheduling at least one meeting for a consumer. The instructions comprising functionality for matching the consumer with a first professional of a plurality of professionals based on information associated with the consumer and the plurality of professionals, where the first professional is qualified to provide service to the consumer, scheduling a first meeting between the consumer and the first professional, and notifying the consumer and the first professional about the first meeting using information associated with the first meeting.

In general, in one aspect, the invention relates to a method of scheduling at least one meeting for a consumer. The method comprises routing the consumer to a first professional of the plurality of professionals based on the information associated with the consumer and the professional, where the first professional is qualified to provide service to the consumer, and notifying the consumer and the first professional about a first meeting using information associated with the first meeting.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scheduling at least one meeting for a consumer. Specifically, embodiments of the invention include matching the consumer to a professional from a plurality of professionals based on information associated with the consumer and the plurality of professionals, scheduling a meeting between the consumer the professional and providing a notification to the consumer and the professional, where the professional is qualified to service the consumer.

In one or more embodiments of the invention, a consumer may be looking for a service which only certain certified and/or trained professionals from a group of professionals can provide competently. Embodiments of the invention allow matching of the consumer with a qualified professional to provide service to the consumer. Furthermore, after matching, a meeting may be arranged between the professional and the consumer allowing the qualified professional to service the consumer.

Figure 1:
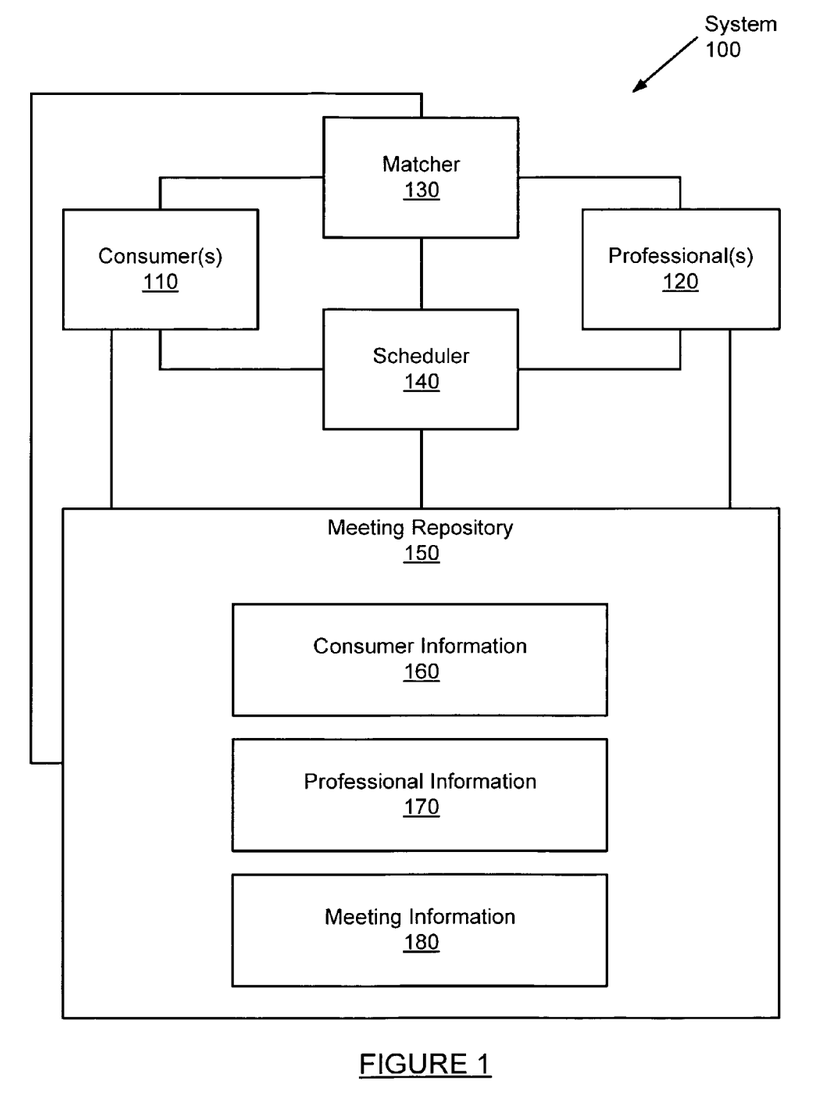
FIG. 1 shows a diagram of a system for scheduling a meeting in accordance with one or more embodiments of the invention.

FIG. 1 shows a system (100) in accordance with one or more embodiments of the invention. As shown in FIG. 1, the system (100) includes consumer(s) (110), professional(s) (120), a matcher (130), a scheduler (140), a meeting repository (150), consumer information (160), professional information (170), and meeting information (180). Each of these components are described below and may be located on the same device (e.g., a server, mainframe, desktop PC, laptop, PDA, television, cable box, satellite box, kiosk, telephone, mobile phone, or any other appropriate device) or may be located on separate devices coupled together, e.g., by a wire, or a network (e.g., Internet, Intranet, Extranet, Local Area Network (LAN), Wide Area Network (WAN), or any other network capable of coupling such devices together), with wire and/or wireless segments.

In one or more embodiments of the invention, the consumer(s) (110) corresponds to one or more persons, groups, or entities that may need professional services. Consumer(s) (110) may also correspond to one or more persons, groups, or entities that are solicited for professional services. In one or more embodiments of the invention, the consumer(s) (110) may be in need of an immediate service or a future service. For example, the consumer(s) (110) may pay a retainer for professional legal services for an anticipated need or may have an urgent need for a tax accountant to file a tax return. In one or more embodiments of the invention, the consumer(s) (110) may enter consumer information (160) and request professional services. Alternatively, consumer information (160) may be obtained from another source such as an advertising agency, a data collection agency, a professional services company or any other source that has access to the consumer information (160).

In one or more embodiments of the invention, consumer information (160) corresponds to any information associated with the consumer(s) (110). For example, consumer information (160) may include identifying information such as a name, an address, an email, a phone number, a social security number, a driver's license number or any other identifying information. In one or more embodiments of the invention, consumer information (160) may include service-related information such as income information, asset information, dependant information, loss information, liability information or any other tax related information when the service includes the filing of a tax return. For example, when the consumer(s) (110) needs a medical service, the consumer information (160) may include a medical history, allergies, diseases, symptoms, a family medical history or any other medical information deemed relevant to the medical service.

In one or more embodiments of the invention, consumer information (160) includes information associated with previous services received. For example, if the consumer(s) (110) needs tax related services or is a potential candidate for tax related services, consumer information (160) may include one or more portions of information associated with and about previous tax services used, and one or more portions of information associated with and about professionals previously used by the consumer. Consumer information (160) may also include a preference for a particular tax professional. Additionally, consumer information (160) may include a preference against a particular tax professional. In one or more embodiments of the invention, consumer information (160) includes information associated with the availability of a consumer(s) (110). For example, consumer information (160) may include one or more availability periods, a preferred meeting time, a work schedule, a vacation schedule or any other information deemed useful for scheduling purposes.

Continuing with FIG. 1, in one or more embodiments of the invention, the professional(s) (120) corresponds to one or more persons, groups, or entities qualified to provide a professional service based on certification or training. Examples of professional(s) (120) include but are not limited to tax professionals, medical professionals, real estate professionals, legal professionals, caterers, entertainment professionals, event managers, engineering professionals, architects, designers, and musicians.

In one or more embodiments of the invention, professional information (170) corresponds to any information associated with one or more professionals (120). For example, the professional information (170) associated with and about a radiologist may include the number of x-rays taken by the radiologist, whereas the professional information (170) associated with an internal medicine doctor may include the number of years in practice. Further, professional information (170) may include different types of information for professional(s) (120) in the same profession. For example, one tax attorney's information may include the type of consumer(s) (110) (e.g., businesses or individuals) that the tax attorney services, whereas a second tax attorney's information may not include such information. Professional information (170) may include, but is not limited to, identifying information such as a name, an address, an email, a phone number, a social security number, a professional license number, a driver's license number or any other identifying information associated with and about the professional(s) (120). In one or more embodiments of the invention, the professional information (170) may include qualification information such as the type of training received, the certifications obtained, an experience level, a rating or any other qualification information deemed relevant. For example, professional information (170) corresponding to a tax accountant may include training programs completed, tax preparation certifications, years of experience, certified public accountant certification, degrees earned or any other information deemed appropriate. Another example involves professional information (170) associated with an attorney. The professional information (170) may include a fee schedule for services provided by the attorney, certifications with state bar associations, the type of practice, the size of the firm used to support legal services, the experience level of the attorney, or any other information deemed appropriate. In one or more embodiments of the invention, professional information (170) includes a rating associated with each professional. The rating may be based on one or more portions of the information associated with the professional, polls by third party organizations, reviews given by consumers, reviews given by a peer, or other criteria deemed important.

In one or more embodiments of the invention, professional information (170) includes information associated with previous services provided by the professional(s) (120). For example, if the professional(s) (120) is qualified to provide tax related services, corresponding professional information (170) may include previous tax services provided, information associated with consumers previously serviced by the professional(s) (120) or any other information associated with and about the previous tax services provided. Professional information (170) may also include a preference for a particular consumer(s) (110). Additionally, professional information (170) may include a preference against a particular consumer(s) (110). For example, if a medical professional has provided services to a patient and thereafter been sued for malpractice by the patient, the medical professional may choose to deny service to the patient in the future. In one or more embodiments of the invention, professional information (170) includes information associated with the availability of the professional(s) (120). For example, professional information (170) may include one or more availability periods, a preferred meeting time, a work schedule, a vacation schedule or any other information deemed appropriate to scheduling.

In one or more embodiments of the invention, the meeting information (180) corresponds to any information associated with one or more prior meetings or one or more future scheduled meetings between the consumer(s) (110) and professional(s) (120). In one or more embodiments of the invention, meeting information (180) may include the type of meeting, the date of the meeting, the time period scheduled for a meeting, consumer information, professional information, a priority associated with the meeting, or any other relevant information. For example, the meeting information (180) for a tax attorney and a business consumer may include one or more scheduled periods for prior meetings or scheduled future meetings, the type of business associated with the consumer, the size of the business, and information identifying the professionals (120) that are scheduled to service the consumer(s) (110).

Continuing with FIG. 1, in one or more embodiments of the invention, a matcher (130) corresponds to any application or machine that matches the consumer(s) (110) with the professional(s) (120), based on the consumer information (160), the professional information (170), and/or the meeting information (180).

In one or more embodiments of the invention, the matcher (130) may determine which professional(s) (120) is qualified to service the consumer(s) (110) based on the needs of the consumer(s) (110) and the qualification of the professional(s) (120). In one or more embodiments of the invention, a matcher (130) may use one or more ratings (e.g., numerical ratings given by prior consumers) of the professional(s) (120), the current or anticipated future workload of a professional(s) (120), narrative consumer reviews of the professional(s) (120), management reviews of the professional(s) (120), or any other suitable criteria to determine with which qualified professional(s) (120) to match the consumer(s) (110). The matcher (130) may also use the consumer information (160) and the professional information (170) to determine one or more availability periods of the professional(s) (120) and the consumer(s) (110). In one or more embodiments of the invention, the matcher (130) matches consumer(s) (110) with professional(s) (120) that have at least one overlapping availability period.

In one or more embodiments of the invention, the matcher (130) may match based on a matrix with consumer information (160) and professional information (170). The matrix may be used to evaluate a match value based on the common information contained within consumer information (160) and professional information (170). For example, if consumer(s) (110) has a preference for a particular professional(s) (120), and has a need for particular tax services, the preferred particular professional(s) (120) that can competently provide the service will is matched with the consumer. Further, in one or more embodiments of the invention, consumer information (160) and professional information (170) may include a set of attributes each with values that are used to determine matching. The values associated with each attribute (e.g., experience level, availability, priority, ratings, and any other relevant information that may be used for matching) may be entered, modified, or deleted. These attribute values may be maintained in a data structure known in the art and referenced when matching the consumer(s) (110) with the professional(s) (120). For example, a professional(s) (120) with a low workload may be deemed to have a high value for an availability attribute and a professional(s) (120) inexperienced for the service sought may be deemed to have a low value for an experience level attribute. In one or more embodiments of the inventions, the consumer(s) (110) is matched with the professional(s) (120) with the greatest total attribute value.

In one or more embodiments of the invention, the matcher (130) may match based on a priority of attributes associated with the consumer(s) (110) and the professional(s) (120). For example, first each professional(s) (120) competent to provide the service sought by the consumer(s) (110) is selected. Next, if more than one professional(s) (120) is competent, then each professional(s) (120) preferred by the consumer(s) (110) is further selected. Further selections may be made to determine a matching based on available attribute information (e.g., certifications, skill level, rating, availability, workload, seniority, fee schedule, and any other information that may be deemed useful for matching). If two or more professionals (120) have the same attributes or same attribute values, one of the professionals (120) may be randomly matched with the consumer(s) (120). In another embodiment of the invention, two or more professionals (120) with the same attributes or same attribute values may be matched in a round robin methodology in order to evenly distribute the services needed by consumers (110).

In one or more embodiments of the invention, the matcher (130) rematches the consumer(s) (110) to a second professional(s) (120). The matcher (130) may rematch in response to a change in consumer information (160), professional information (170), and/or meeting information (180). The service needed by the consumer(s) (110) may change or may be better understood before or during the first meeting and a determination may be made that the original professional(s) (120) matched with the consumer(s) (110) is not suitable. Therefore, the consumer may be rematched to a second professional(s) (120) that can better address the services needed by the consumer(s) (110). For example, a doctor may determine in a first meeting with a patient that the patient needs a lung specialist. In this example, the matcher (130) may rematch the consumer(s) (110) to a lung specialist based on the new consumer information (160).

In one or more embodiments of the invention, the matcher (130) may be automated, requiring little or no human intervention. The matcher (130) may be activated and matching performed upon submission of information by the consumer(s) (110). In one or more embodiments of the invention, matching may be done in groups or classes. For example, all consumer information (160) and professional information (170) received may be analyzed at the end of every month to determine the matches between consumer(s) (110) and professional(s) (120). In one or more embodiments of the invention, a matcher (130) may provide information associated with potential consumer(s) (110) to a qualified professional(s) (120) in order for the professional(s) (120) to solicit the consumer(s) (110) with professional services.

In one or more embodiments of the invention, the matcher (130) does not match consumer(s) (110) with professional(s) (120), which have continually received bad reviews, bad ratings, or any other negative evaluation. In one or more embodiments of the invention, the matcher (130) may delete professional information (170) or consumer information (160) from the meeting repository (150). For example, consumer information (160) corresponding to a consumer(s) (110) who never pays the fee for a professional service received, may be deleted from the meeting repository (150) and further matching may be denied to the consumer(s) (110).

In one or more embodiments of the invention, the scheduler (140) uses the matching performed by the matcher (130) to schedule a meeting between the consumer(s) (110) and the professional(s) (120). The scheduler (140) may schedule a date and time for the meeting between the consumer(s) (110) and the professional(s) (120). In one or embodiments of the invention, the scheduler (140) may use distributed scheduling by reserving a block of time for meetings between the consumer(s) (110) and the professional(s) (120). For example, the scheduler (140) may tentatively schedule twenty consumer(s) (110) per week for meeting with a tax professional(s) (120), and schedule specific times and dates at a later date.

In one or more embodiments of the invention, once the scheduler (140) has scheduled a meeting, the scheduler (140) may provide the corresponding meeting information (180) to the consumer(s) (110) and the professional(s) (120). The meeting information (180) may be provided through mail, email, website notification, facsimile, wire, or any other suitable form of communication. The scheduler (140) may also provide corresponding consumer information (160) and professional information (170). In one or more embodiments of the inventions, the scheduler (140) maintains a table of meetings for a professional(s) (120) that is accessible to the professional(s) (120) and/or a manager.

Continuing with FIG. 1, in one or more embodiments of the invention, the scheduler (140) cancels scheduled meetings based on changes in the consumer information (160), changes in the professional information (170), input from a manager or any other information deemed relevant to a meeting cancellation. A scheduler (140) may provide a cancellation notice to any party affected by the cancellation. In one or more embodiments of the invention, professional(s) (120) may first be presented with meeting information (180) to which the professional(s) (120) may respond. An affirmative response may result in notification of the meeting provided to the consumer(s) (110), whereas a negative response may result in the scheduler (140) rescheduling using a different time, a different date, and/or a different professional(s) (120).

In one or more embodiments of the invention, the scheduler (140) may reschedule a cancelled meeting or update a meeting time and date based on the availability of both the consumer(s) (110) and the professional(s) (120). In one or more embodiments of the invention, the scheduler (140) may schedule a web based meeting, a teleconference, an in-person meeting, a video conference, or any other suitable meeting medium which allows the consumer(s) (110) and the professional(s) (120) to communicate. Further, in one or more embodiments of the invention, a scheduler (140) may schedule more than one consumer (110) and/or more than one professional (120) for a single meeting.

In one or more embodiments of the invention, the scheduler (140) is automated requiring little or no human intervention. An example, which in no way is intended to limit the invention, may include an automated matcher (130) and an automated scheduler (140). An automated matcher (130) matches the consumer(s) (110) to the professional(s) (120) upon receiving the consumer information (160) and the professional information (170) and provides the match information to the scheduler (140). The scheduler (140) may then schedule the meeting between the consumer(s) (110) and the professional(s) (120) and provide the meeting information (180) to both the consumer(s) (110) and the professional(s) (120). In one or more embodiments of the invention, the scheduler (140) may provide more than one meeting time to the consumer(s) (110) based on the match information, and allow the consumer(s) (110) to select a time.

Continuing with FIG. 1, in one or more embodiments of the invention, the meeting repository (150) stores the consumer information (160), the professional information (170), and the meeting information (180). In one or more embodiments of the invention, the information (e.g., consumer information (160), professional information (170) and meeting information (180)) stored within the meeting repository (150) may be stored in any manner, such as a single file in a single system, multiple files in a single system, or multiple files distributed across multiple systems.

In one or more embodiments of the invention, access to the meeting repository (150) is restricted to protect any confidential information. To protect the data, access to the meeting repository (150) may require authentication using passwords, secret questions, personal identification numbers (PINs), biometrics or any other processes or architecture necessary to prevent access by unauthorized parties. Those skilled in the art will appreciate that elements stored in the meeting repository (150) may be distributed and stored in multiple meeting repositories accessible across one or more networks, files systems, or any other storage components. In one or more embodiments of the invention, the meeting repository (150) is implemented using a database, a hierarchical (flat) file, or any other suitable data store.

Figure 2:
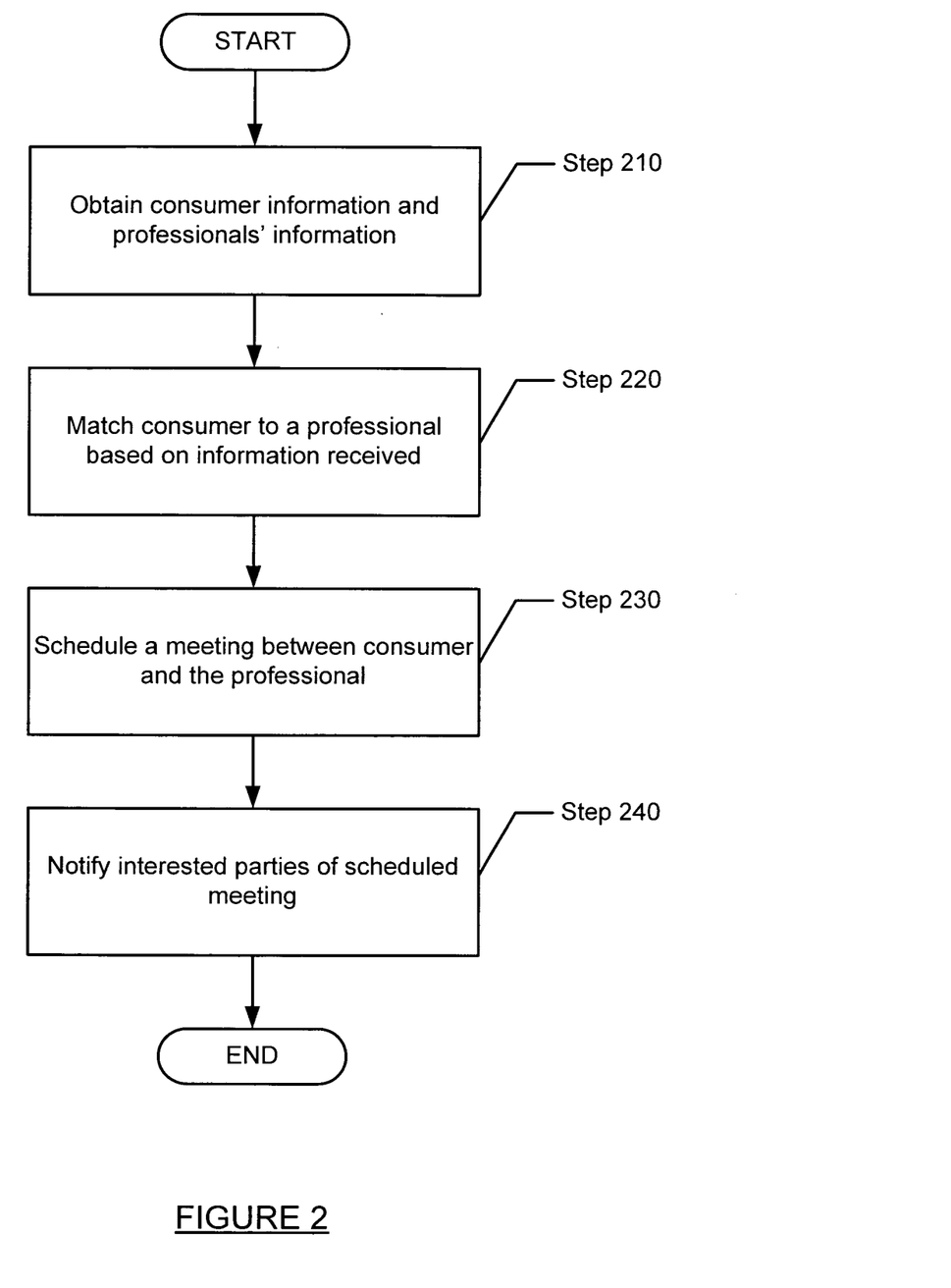
FIGS. 2-3 show a flow chart for scheduling a meeting in accordance with one or more embodiments of the invention.

FIG. 2 shows a flow chart to schedule at least one meeting for a consumer, in accordance with one or more embodiments of the invention. In Step 210, information associated with consumer(s) and professional(s) is obtained. Consumer information and professional information may be received from any source. For example, consumer information may be entered by the consumer, a research company that collects information, a professional that has serviced the consumer in the past, a third party organization (such as a credit bureau, governmental agency or any other entity that may have access to consumer information), or any other source with information regarding current and/or potential services needed by the consumer. Likewise, professional information may be received from any source such as the professional, a research company that collects information, a consumer that has used the professional in the past, a third party organization that governs the professional (e.g., a state bar association, a taxing authority, a watch dog organization, or any other entity that may have access to professional information), or any other source with information regarding services that a professional may provide.

In Step 220, a consumer is matched with a professional based on the consumer information and the professional information. In one or more embodiments of the invention, a consumer may be matched with multiple professionals that are qualified to provide competent service to the consumer. A consumer may also be matched with the highest ranked qualified professional that is available. In one or more embodiments of the inventions, ranking of the qualified professionals may be made using availability, experience level, workload, efficiency, fees, reviews from past consumers, reviews from past managers, and any other information deemed relevant.

In one or more embodiments of the invention, the matching may be performed based on a matching value between a consumer and a professional. The matching value may be determined for all professionals using, for example, a matrix with the professionals' attributes and the consumer's needs, as discussed above in relation to FIG. 1. In one or more embodiments of the invention, a positive or negative value (that may vary) is added for each attribute based on the significance of the attribute and a correlation between the consumer and the professional. Finally, a total matching value is calculated for each professional and the professional with the highest matching value is selected. In one or more embodiments of the invention, if two or more professionals have the highest equivalent matching values based on all of the attributes, a professional may be selected at random out of the top scoring professionals or in a round robin pattern to distribute the services needed by consumers.

Continuing with FIG. 2, in one or more embodiments of the invention, characteristics of the consumer and/or the professional may be used to prioritize matching. For example, repeat consumers or consumers with a significant amount of business may be matched before new customers or consumers with minimal business. Further, professionals from a particular company may be matched before professionals from other companies or professionals with additional certifications maybe matched before professionals without the additional certifications.

In one or more embodiments of the invention, matching may be performed by selecting a sub group of professionals from a group of professionals based on an attribute and, then repeatedly selecting subgroups from the previously selected subgroup based on other attributes until one professional remains. For example, the initial selection may be made based on availability and competence of the professionals that matches the consumer's needs. Next, a selection may be made based on another attribute such as a ranking given to the professional by his peers. Third, a selection of the professional is made based on the fee schedule for the professional. The selection process results in a matching professional that is competent, available, highly ranked, and charges the lowest fees. In one or more embodiments of the invention, the matching method used to match the consumer with the professional may be selected by an administrator or the consumer. In one or more embodiments of the invention, various matching methods may be recommended to the consumer for selection of a particular matching method. Further, in one or more embodiments of the invention, a consumer may be matched with multiple professionals for multiple services needed or a single professional to address the multiple needs of the consumer.

In Step 230, a meeting is scheduled between the consumer and the professional. In one or more embodiments of the invention, the meeting is scheduled based on the matching already performed that links a consumer to one or more professionals in Step 220. In one or more embodiments of the invention, the meeting information stored in the meeting repository is used to suggest one or more possible times for scheduling the meeting between the consumer and the professional. In one or more embodiments of the invention, the consumer selects a meeting time from the possible times available for scheduling the meeting. In one or more embodiments of the invention, the meeting is scheduled after approval from a professional and/or approval from a consumer. In one or more embodiments of the invention, scheduling may be performed in groups. For example, an annual tax meeting schedule may be organized after all consumers have been matched to one or more tax professionals.

In Step 240, interested parties deemed relevant to the meeting are notified of the scheduled meeting. For example, the interested parties for a meeting notification for a meeting between a doctor and a patient may include the doctor, the doctor's assistant, the attending nurse, the medical office, the patient, and the patient's guardian. Further, a meeting notification may be provided through any medium including electronic mail, postal mail, webpage notification, facsimile, or any other suitable communication medium. In one or more embodiments of the invention, a meeting reminder may be sent to remind interested parties of the meeting.

Consider the following example, which in no way is intended to limit the invention. A group of twenty tax professionals enter information associated with their past experience, training, skill level, preferences, times available to meet with consumers, and qualifications for providing services. Management for the professionals enters reviews received for each professional from past consumers. This information associated with the group of professionals is stored in a repository for later use.

Thereafter, a consumer who needs to file a tax return for his personal income and who needs to report a change in the accounting method used by his business enters a request for a professional. The consumer also enters information regarding the preference for five tax professionals that the consumer has worked with in the past, his annual income, and his time preferences to meet with a professional.

A matcher receives the consumer's information and determines (based on the information available) that the consumer needs to file his personal taxes using a 1040EZ and also needs to file Form 3115 for a change in accounting method.

The matcher may then use the consumer's information and professionals' information to determine the optimal matching. First the matcher determines whether any of the five tax professionals preferred by consumer can serve all of the consumer's needs. Although all five tax professionals have filed personal taxes using a 1040EZ, none of the five preferred professionals have any experience or knowledge regarding Form 3115 for a change in accounting method. The matcher then finds two alternate tax professionals within the group of twenty that have experience filing Form 3115. The matcher then determines that the first experienced professional is not available to service additional consumers for several weeks. Thus, the matcher matches the consumer with the second experienced professional for servicing the consumer's business needs.

Thereafter, the matcher determines that each of the five preferred professionals is competent to help the consumer file the 1040EZ. The matcher then accesses the availability for each professional, stored in the repository, and compares the consumer's available time with the availability of each professional. The matcher finds that the first of the five preferred professionals does not have available time periods that match the consumer's availability. Next, the matcher analyzes the reviews for the remaining four professionals within the past six months and finds that the second of the five professionals has received many negative reviews in the past month.

As a result of the analysis thus far, the matcher determines that the third, fourth, and fifth professional are qualified, preferred, available, and do not have negative feedback within the last six months. Next, the matcher accesses the rankings of each of the third, fourth and fifth professionals, finding that the fourth and fifth preferred professionals have the highest ranking given by their superiors. In this example, the fourth and fifth preferred professionals have all equivalent attributes in regards to the needs of the consumer. Therefore, the matcher randomly picks the fourth professional out of the two remaining professionals and matches the consumer with the fourth professional.

Next, the scheduler receives the match information generated for the consumer and schedules meetings for the consumer. The scheduler may first determine a mutually available time for a meeting between the consumer and the fourth preferred professional by determining overlapping availability periods. In this example, suppose the fourth preferred professional is available Monday through Friday 8 am through 2 pm and the consumer is available Tuesdays and Thursdays at 10 am, the scheduler may schedule a meeting for the coming Tuesday at 10 am for one hour. Next, a notification of the meeting is provided to the consumer, the consumer's personal secretary, the fourth preferred professional, and the secretary working for the fourth preferred professional.

The scheduler then makes a determination of the amount of time needed for the meeting (with the second experienced professional) based on meetings in the past that addressed similar consumer needs, complexity of the consumer's business needs, and the knowledge of the consumer. Also, the scheduler determines that the second experienced professional is available on Thursdays and Fridays. Thus, the scheduler schedules a meeting for the coming Thursday for two hours starting at noon.

This example, may further involve cancellation of a meeting with the fourth preferred professional and rescheduling the meeting with the fifth preferred professional if the fourth preferred professional is sick at the originally scheduled meeting time. This rescheduling may be done based on the previous matching performed by the matcher which matches the consumer with a secondary professional (i.e., fifth preferred professional) in case of a cancellation by the originally matched professional.

Figure 3:
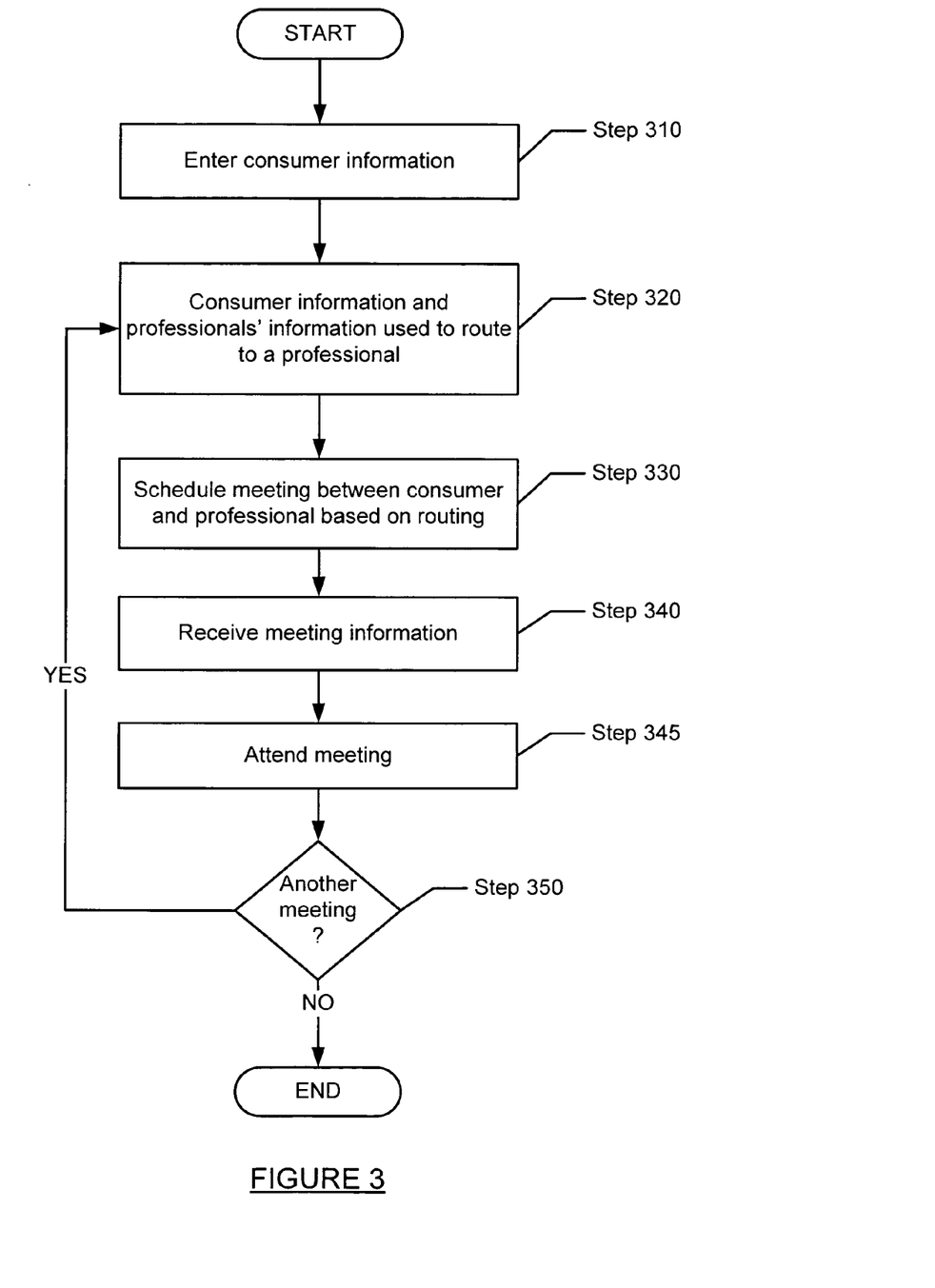

FIG. 3 shows a flowchart for obtaining a meeting with a professional by a consumer in accordance with one or more embodiments of the invention. In Step 310, consumer information is entered. The consumer information may be entered through any communication medium such as an email, a facsimile, a phone call, a text message, a web page submission, and postal mail. The consumer information includes at least information regarding the type of service sought.

In Step 320, based on consumer information (e.g., the type of service sought and any other information deemed relevant) and professionals' information (e.g., the available personnel qualified to perform the service and any other information deemed relevant), the consumer is matched with one or more qualified professionals. For example, if a consumer has multiple needs such as advice on real estate planning, estate planning and divorce, the consumer may be matched with three different attorneys each specializing in property law, estate law, and family law, respectively.

In Step 330, the match information from Step 320 is used to schedule a meeting between the consumer and one or more corresponding professionals with which the consumer has been matched.

In Step 340, meeting information for the scheduled meeting is received. The meeting information may be in the form of a proposed time and place. The meeting information may include multiple meeting options from which a consumer may select the most favorable meeting time, place, and/or professional to service the consumer. In one or more embodiments of the invention, all meeting information received may be organized by consumer, date, field, or any other suitable organization method.

In Step 345, the consumer attends the scheduled meeting with the one or more corresponding professionals to provide the requested service. As mentioned above, the consumer and/or the professional(s) may be unable or unwillingly to attend at the scheduled time and the meeting may need to be re-scheduled or postponed. Further, depending on the success of the meeting or time necessary to resolve all issues, another meeting may be required (Step 350). If another meeting is necessary, Steps 320-Step 350 are repeated until the consumer is successfully provided the services requested (or no longer needs the services).

In one or more embodiments of the invention, a consumer is routed to a professional qualified to provide a service to the professional. Routing the consumer to the professional includes matching the consumer with a professional qualified to provide a service to the consumer and scheduling a meeting between the professional and the consumer.

Figure 4:
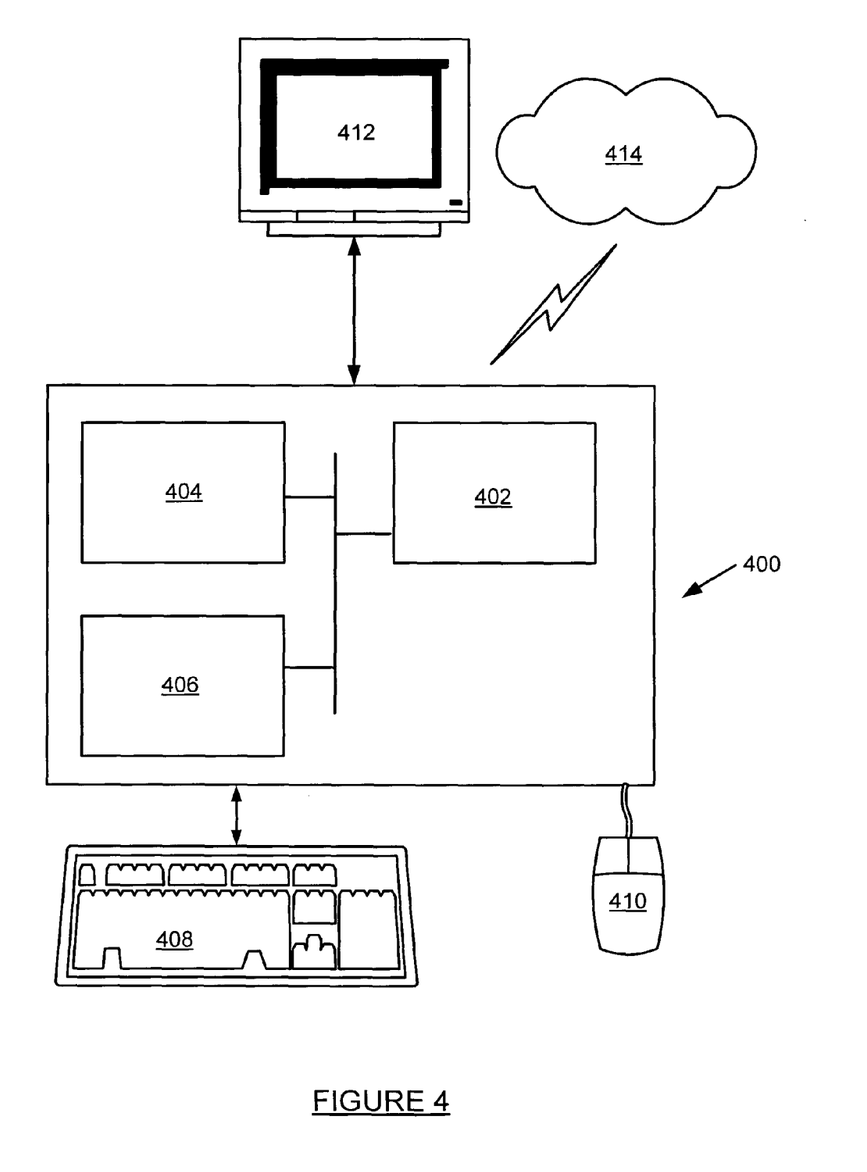
FIG. 4 shows a computer system in accordance with one embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (414) via a network interface connection. Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., a matcher, a scheduler, or any other portion) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for tax preparation assistance, comprising:

identifying a tax form of a consumer within a tax preparation application;

receiving, from the consumer, a request for help in completing a plurality of fields on the tax form directed towards a tax topic, wherein the request for help comprises a plurality of priorities comprising an experience priority, a current workload priority, and a fee schedule priority;

calculating, based on the tax topic, an estimated meeting duration;

identifying a plurality of tax preparation professionals specializing in the tax topic;

identifying, for a first tax preparation professional of the plurality of tax preparation professionals, a plurality of professional information comprising an experience level, a current workload, and a fee schedule;

generating, for the first tax preparation professional, a matching value based on a mathematical function of the plurality of priorities and the plurality of professional information;

matching, by a hardware processor, the first tax preparation professional to the consumer based on the matching value;

scheduling, after matching the first tax preparation professional to the consumer and based on the estimated meeting duration and an availability of the first tax preparation professional, a first meeting between the consumer and the first tax preparation professional using the hardware processor; and notifying the consumer and the first tax preparation professional of the first meeting.

2. The method of claim 1, further comprising:
receiving, based upon a review of the plurality of fields, instructions from the first tax preparation professional to increase the estimated meeting duration.

3. The method of claim 1, wherein matching the first tax preparation professional to the consumer is further based upon a type of tax return comprising the tax form and a level of complexity associated with the tax form.

4. The method of claim 1, wherein matching the first tax preparation professional to the consumer is further based upon at least one selected from a group consisting of an occupation associated with the consumer, a number of dependants associated with the consumer, an income associated with the consumer, an itemized deduction associated with the consumer, and availability of the consumer.

5. The method of claim 1, wherein matching the first tax preparation professional to the consumer is further based upon at least one selected from a group consisting of a skill level of the first tax preparation professional and a history of the first tax preparation professional with the consumer.

6. The method of claim 1, wherein the first meeting is facilitated as at least one selected from a group consisting of a phone meeting, an in person meeting, and a web-based meeting.

7. The method of claim 1, wherein the first tax preparation professional is certified by a regulating agency.

8. The method of claim 1, further comprising:
receiving, from the consumer, feedback regarding the first tax preparation professional based on a service provided during the first meeting.

9. The method of claim 1, further comprising:
providing a list of scheduled meetings for the first tax preparation professional to a manager of the first tax preparation professional.

10. The method of claim 1, wherein generating the matching value comprises:
calculating an experience attribute value based on the experience priority and the experience level;
calculating a current workload attribute value based on the current workload priority and the current workload; and
calculating an fee schedule attribute value based on the fee schedule priority and the fee schedule, wherein the matching value is generated based on a summation of the experience attribute value, the current workload attribute value, and the fee schedule attribute value.

11. The method of claim 1, further comprising:
receiving an update to the plurality of professional information;
matching, in response to the update, a second tax preparation professional of the plurality of tax preparation professionals to the consumer;
cancelling the first meeting in response to matching the second tax preparation professional; and
scheduling, based on the estimated meeting duration and an availability of the second tax preparation professional, a second meeting between the consumer and the second tax preparation professional.

12. The method of claim 1, wherein matching the first tax preparation professional to the consumer is further based upon a preference for the first tax preparation professional.

13. The method of claim 1, further comprising:
completing the plurality of fields during the first meeting.

14. The method of claim 1, further comprising:
updating information associated with the consumer and the first tax preparation professional based on a service provided during the first meeting.

15. The method of claim 1, further comprising:
receiving, from the first tax preparation professional, feedback regarding the consumer following the first meeting.

16. A system for tax preparation assistance, comprising:
a hardware processor;
a scheduler executing on the hardware processor and comprising functionality to:
identify a tax form of a consumer within a tax preparation application,
receive, from the consumer, a request for help in completing a plurality of fields on the tax form directed towards a tax topic, wherein the request for help comprises a plurality of priorities comprising an experience priority, a current workload priority, and a fee schedule priority,
calculate, based on the tax topic, an estimated meeting duration,
identify a plurality of tax preparation professionals specializing in the tax topic,
identify, for a first tax preparation professional of the plurality of tax preparation professionals, a plurality of professional information comprising an experience level, a current workload, and a fee schedule,
generate, for the first tax preparation professional, a matching value based on a mathematical function of the plurality of priorities and the plurality of professional information,
schedule, after matching the first tax preparation professional to the consumer and based on the estimated meeting duration and an availability of the first tax preparation professional, a first meeting between the consumer and the first tax preparation professional, and
notify the consumer and the first tax preparation professional of the first meeting; and
a matcher executing on the hardware processor and comprising functionality to:
match the first tax preparation professional to the consumer based on the matching value.

17. The system of claim 16, wherein the first meeting is facilitated as at least one selected from a group consisting of a phone meeting, an in person meeting, and a web based meeting.

18. The system of claim 16, wherein generating the matching value comprises:
calculating an experience attribute value based on the experience priority and the experience level;
calculating a current workload attribute value based on the current workload priority and the current workload; and
calculating an fee schedule attribute value based on the fee schedule priority and the fee schedule, wherein the matching value is generated based on a summation of the experience attribute value, the current workload attribute value, and the fee schedule attribute value.

19. The system of claim 16, further comprising:
a meeting repository comprising functionality to store information associated with the first meeting.

20. The system of claim 16, wherein matching the first tax preparation professional to the consumer is further based upon a rating associated with the first tax preparation professional.

21. The system of claim 16, wherein the scheduler further comprises functionality to:
receive an update to the plurality of professional information;
cancel the first meeting in response to matching a second tax preparation professional of the plurality of tax preparation professionals to the consumer; and
schedule, based on the estimated meeting duration and an availability of the second tax preparation professional, a second meeting between the consumer and the second tax preparation professional; and
wherein the matcher further comprises functionality to match, in response to the update, the second tax preparation professional to the consumer.

22. A non-transitory computer readable storage medium storing a plurality of instructions for tax preparation assistance, the plurality of instructions comprising functionality to:
identify a tax form of a consumer within a tax preparation application;
receive, from the consumer, a request for help in completing a plurality of fields on the tax form directed towards a tax topic, wherein the request for help comprises a plurality of priorities comprising an experience priority a current workload priority, and a fee schedule priority;
calculate, based on the tax topic, an estimated meeting duration;
identify a plurality of tax preparation professionals specializing in the tax topic;
identify, for a first tax preparation professional of the plurality of tax preparation professionals, a plurality of professional information comprising an experience level, a current workload, and a fee schedule;
generate, for the first tax preparation professional, a matching value based on a mathematical function of the plurality of priorities and the plurality of professional information;
match the first tax preparation professional to the consumer tax form based on the matching value;
schedule, after matching the first tax preparation professional to the consumer and based on the estimated meeting duration and an availability of the first tax preparation professional, a first meeting between the consumer and the first tax preparation professional; and
notify the consumer and the first tax preparation professional of the first meeting.

23. The non-transitory computer readable storage medium of claim 22, wherein the plurality of instructions further comprise functionality to:
receive, from the consumer, feedback regarding the first tax preparation professional based on a service provided during the first meeting.

24. The non-transitory computer readable storage medium of claim 22, wherein the plurality of instructions further comprise functionality to:
provide a list of scheduled meetings for the first tax preparation professional to a manager of the first tax preparation professional.

25. The non-transitory computer readable storage medium of claim 22, wherein the first tax preparation professional is certified by a regulating agency.

26. The non-transitory computer readable storage medium of claim 22, wherein matching the first tax preparation professional to the consumer is further based upon a type of tax return and a level of complexity associated with the tax form.

27. The non-transitory computer readable storage medium of claim 22, wherein matching the first tax preparation professional to the consumer is further based upon at least one selected from a group consisting of an occupation associated with the consumer, a number of dependants associated with the consumer, an income associated with the consumer, an itemized deduction associated with the consumer, and availability of the consumer.

28. The non-transitory computer readable storage medium of claim 22, wherein matching the first tax preparation professional to the consumer is further based upon at least one selected from a group consisting of a skill level of the first tax preparation professional and a history of the first tax preparation professional with the consumer.

29. The non-transitory computer readable storage medium of claim 22, wherein the first meeting is facilitated as at least one selected from a group consisting of a phone meeting, an in person meeting, and a web-based meeting.

30. The non-transitory computer readable storage medium of claim 22, wherein the plurality of instructions further comprise functionality to:
receive, based upon a review of the plurality of fields, instructions from the first tax preparation professional to increase the estimated meeting duration.

31. The non-transitory computer readable storage medium of claim 22, wherein generating the matching value comprises:
calculating an experience attribute value based on the experience priority and the experience level;
calculating a current workload attribute value based on the current workload priority and the current workload; and
calculating an fee schedule attribute value based on the fee schedule priority and the fee schedule, wherein the matching value is generated based on a summation of the experience attribute value, the current workload attribute value, and the fee schedule attribute value.

32. The non-transitory computer readable storage medium of claim 22, wherein the plurality of instructions further comprise functionality to:
receive an update to the plurality of professional information;
match, in response to the update, a second tax preparation professional of the plurality of tax preparation professionals to the consumer;
cancel the first meeting in response to matching the second tax preparation professional; and
schedule, based on the estimated meeting duration and an availability of the second tax preparation professional, a second meeting between the consumer and the second tax preparation professional.

33. The non-transitory computer readable storage medium of claim 22, wherein the plurality of instructions further comprise functionality to:
update information associated with the consumer and the first tax preparation professional based on a service provided during the first meeting.

34. The non-transitory computer readable storage medium of claim 22, wherein matching the first tax preparation professional to the consumer is further based upon a preference of the consumer for the first tax preparation professional.

35. The non-transitory computer readable storage medium of claim 22, wherein the plurality of instructions further comprise functionality to:
  receive, from the first tax preparation professional, feedback regarding the consumer following the first meeting.

* * * * *